June 24, 1930.   A. McL. NICOLSON   1,766,044
MECHANICAL COUPLING FOR PIEZO ELECTRIC CRYSTAL DEVICES
Filed Jan. 11, 1927
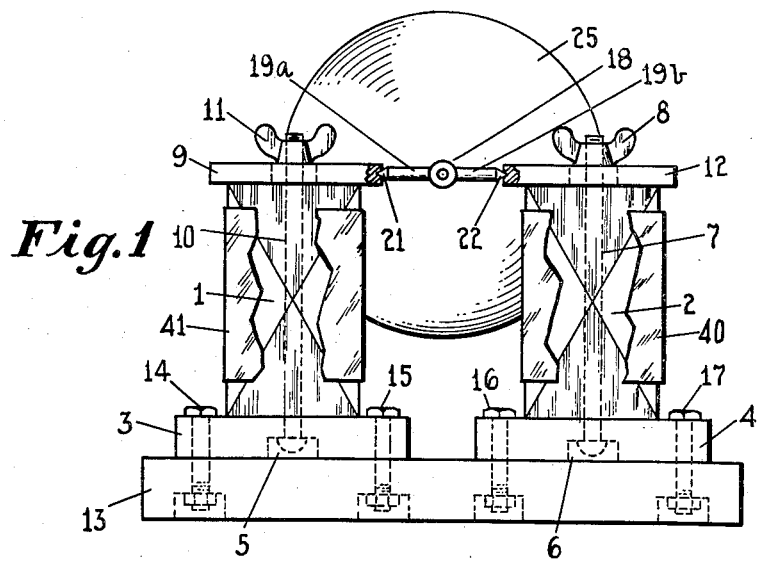
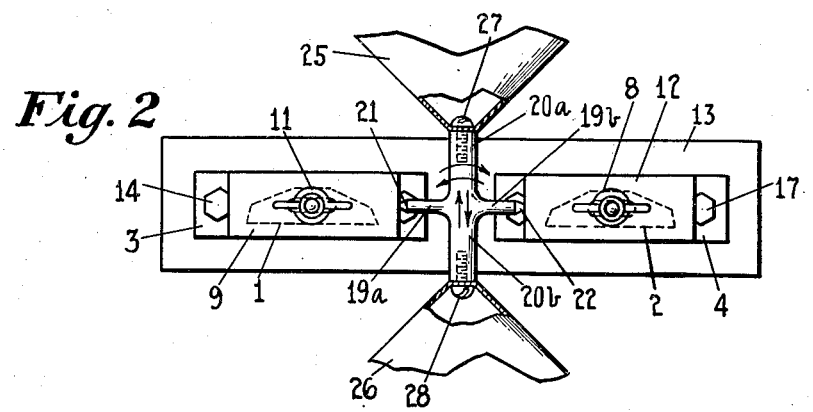
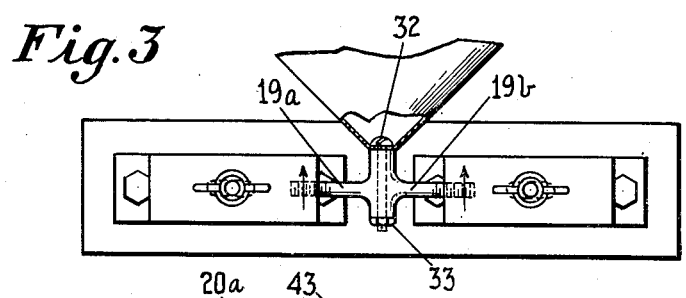
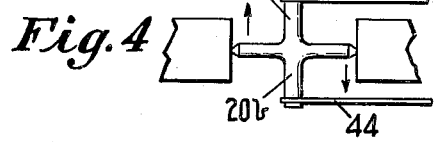
INVENTOR
ALEXANDER McLEAN NICOLSON
BY
Clyde A. Norton
ATTORNEY Patented June 24, 1930

1,766,044

UNITED STATES PATENT OFFICE

ALEXANDER McLEAN NICOLSON, OF NEW YORK, N. Y., ASSIGNOR, BY MESNE ASSIGNMENTS, TO FEDERAL TELEGRAPH COMPANY, A CORPORATION OF CALIFORNIA

MECHANICAL COUPLING FOR PIEZO-ELECTRIC CRYSTAL DEVICES

Application filed January 11, 1927. Serial No. 160,360.

This invention relates to piezo-electric crystal devices, and more particularly to arrangements comprising a pair of component crystal devices mounted on opposite sides of a plane of maximum vibration, operated in predetermined phase relation and coupled together and to a load or source of power through suitable mechanical coupling means.

It is an object of this invention to provide an apparatus of the class described which will permit the mechanical coupling of crystal devices, operating in predetermined mechanical phase relation, either in the same or opposite phase, and operating either as a motor or generator.

It is a further object of this invention to provide such a device in which the mechanical coupling means is positive and reliable and which affords the possibility of multiplying the motion of the crystal device.

It is a further object of this invention to provide such a device which is as simple as possible and which may be quickly and easily assembled and adjusted, and which will retain its adjustment.

Still other objects of my invention will be apparent from the specification.

The features of novelty which I believe to be characteristic of my invention are set forth with particularity in the appended claim. My invention itself, however, both as to its fundamental principles and as to its practical embodiments, will best be understood by referring to the specification and accompanying drawing, in which:

Fig. 1 is a front elevation, partially broken away, of apparatus according to my invention.

Fig. 2 is a top plan view thereof, partially broken away.

Fig. 3 is a top plan view of a modified form thereof.

Fig. 4 is a diagrammatic view of a still further modification.

It has been known for some time that certain substances, such as quartz, tourmaline, Rochelle salt crystals, etc., give rise to electric charges when stressed, and conversely, when electric charges are impressed upon them in certain ways, they are stressed or deformed mechanically. Under certain conditions, this deformation may take the form of expansion in one direction and contraction in another direction, and if the charges be applied in certain ways, as is known in the art, torsional vibrations of these devices result. For example, if an internal electrode passing longitudinally through a Rochelle salt crystal be given a charge of one sign, and an equatorial electrode such as a belt of metal foil or gauze extending around the crystal and forming a loop thereabout in a plane normal to the internal electrode, be given a charge of opposite sign, torsional vibration or deformation of the crystal results, the effect of which is to cause a slight rotation of one end of the crystal with respect to the other end thereof, in a plane normal to the $c$-axis.

Under certain conditions, it may be advisable to utilize a pair of torsionally vibrating crystal devices coupled together in such manner that displacements of the resultant devices are the same as the displacement of the individual components, in other words, a connection mechanically analogous to electrical parallelism, either in connection with translatory movement or rotatory movement of the load or source of power.

In order to obtain such a result, I may utilize a pair of crystal devices particularly adapted for torsional vibration. For example, I may select a pair of Rochelle salt crystals, each provided with electrodes and connections thereto, particularly adapted to torsional vibration thereof. These crystals may be mounted upon a common base plate on opposite sides of a center line of maximum amplitude of vibration: that is to say, it will be understood that if a lever arm be attached to each crystal device and to extend each toward the other, the amplitude of vibration of the lever arms with respect to each other will be greatest at the center point between the two crystal devices.

If it is desired to have these lever arms move mechanically in phase, that is, to have their ends move forward and backward, always facing each other, the electrical connections between the corresponding electrodes must be reversed: for example, the internal electrode of the one crystal should be connected to the equatorial electrode on the other, and both these electrodes connected to one side of the source of potential. The other equatorial electrode and the other internal electrode will similarly be connected together and to the opposite terminal of source of potential. Under these conditions, one crystal will tend to rotate clockwise, and the other will tend to rotate counter-clockwise at a given time and starting from rest, which will cause the arms connected thereto to rotate very slightly with the crystals and to move together away from the other point of rest, in the same direction. If now, a vibratile link be connected to the ends of the lever arms facing each other, this vibratile link will be carried forward and backward in a movement of translation by the action of the crystal devices, and may operate either to carry to a load the movement developed by the vibration of the crystals, or may be connected to a source of vibrations which it is desired to impress upon the crystals.

It will be understood that if corresponding electrodes of the crystals are connected together, the crystals will tend to vibrate both in the same direction, and since the crystals are mounted on opposite sides of the center, the lever arms carried thereby will operate 180° out of phase, that is, each will move away from the center line in opposite directions at the same time. This may be utilized in case it is desired to produce rotary oscillation of the coupling link about a central axis, instead of bodily translation thereof.

Referring now more particularly to Fig. 1, 1 and 2 designate diagrammatically a pair of piezo-electric crystal devices mounted upon individual base plates 3 and 4 respectively. The base plates 3 and 4 may be provided with depressions 5 and 6 on the under side, and the crystals 1 and 2 are provided with longitudinal openings extending therethrough, formed in any suitable manner as for example, by drilling, or by sawing through the crystal, fluting it and cementing it together again by means of suitable cement such for example as Rochelle salt "melt" comprising Rochelle salt fused at a temperature controlled according to the amount of water it is desired to retain in the "melt." The hole through the crystals will be of sufficient size to permit of the passage of suitable bolts 7 and 10 through the base plates 3 and 4, through the crystals 1 and 2 respectively, and through suitable stress distributing members 9 and 12, to be engaged at their upper ends by suitable nuts 8 and 11. The stress distributing members 9 and 12 may be of suitable material of high elasticity and strength, such as steel plates, and sufficient clearance will be allowed in the hole formed therein to permit the passage of the bolt, so that the position of the stress distributing member may be varied to obtain optimum adjustment.

It will be understood that by means of the bolts and nuts, the crystals are secured to the base plates 3 and 4, the stress distributing members are tightly secured to the crystals in such manner that they vibrate therewith, and the desired compression may be applied to the crystals to obtain optimum operation.

The two crystal assemblies thus formed may be mounted upon a common base plate 13 on opposite sides of the center of vibration by means of appropriate bolts 14, 15, 16 and 17 passing through the common base plate 13 and individual base plates 3 and 4, and suitable cooperating nuts may be utilized to fasten the bolts in position.

For the purpose of transmitting the motion of the crystal to the load, or from the source of power to the crystals, a suitable mechanical coupling such as a cruciform link 18 may be provided, having relatively short arms 19$^a$ and 19$^b$ and relatively longer arms 20$^a$ and 20$^b$ extending at right angles thereto. The arms 19$^a$ and 19$^b$ may terminate in points 21 and 22, adapted to enter conical depressions in the stress distributing members 9 and 12, as more particularly shown in Figs. 1 and 2: the other arms 20$^a$ and 20$^b$ may be provided at their ends with tapped holes to receive bolts 27 and 28 for securing suitable acoustic diaphragms 25 and 26 in position.

In assembling the devices, the nuts 8 and 11 will be slacked sufficiently to permit the positioning of link 18 as shown, after which the nuts will be tightened to secure the stress distributing members tightly against the link. Electrode 40 on crystal 2 will be connected to bolt 7, forming the interior electrode of crystal 1, and similarly, a cross connection will be made between bolt 10 and electrode 41 of crystal 1. If now a fluctuating electromotive force be applied between these sets of electrodes, the vibratile link 18 will be carried bodily forward and backward, and as shown by the straight arrows of Fig. 2.

If, on the other hand, the electrodes 40 and 41 are connected together and bolts 7 and 10 are connected together and an electromotive force be impressed upon these electrodes, the link will tend to be rotated or oscillated about a center, as shown by the curved arrows.

Referring now to Fig. 3, I have shown a slightly modified form of link in which the arms 19ª and 19ᵇ, instead of terminating in points, are threaded and corresponding threaded openings are formed in stress distributing members 9 and 12, so that in assembling the devices, the link may be screwed into each of the stress distributing members, after which they may be mounted in position upon the crystal devices. Likewise in this instance, I have shown only a single acoustic diaphragm, held in place by a suitable bolt 32, passing entirely through the link and secured in place by nut 33.

It is to be understood that the amplitudes of motion of the crystal devices herein shown are so small that the elasticity of the material of the stress members and the link is sufficient to compensate for any variation in the distance between the ends of the stress distributing members, due to the fact that such members are tending to rotate about different centers. It is clear that in the case of amplitudes of motion sufficiently large to cause trouble, appropriate provision should be made to avoid this effect.

Referring now to Fig. 4, I have shown an arrangement which may be utilized when it is desired to produce rotation of the vibratile link. In this instance, a pair of driving rods 43 and 44 respectively, may be connected to the arms 20ª and 20ᵇ, for the purpose of connecting the link to a load or to a source of power. It will be understood, if desired, the arms 20ª and driving rod 43, or the arm 20ᵇ and the driving rod 44, may be omitted, or the driving rods may be extended in opposite directions.

While I have shown and described the crystal devices as being single crystals of Rochelle salt, exhibitig the well-known "hour glass" configuration, it will be understood that other piezo-electric devices may be utilized, such as those described in my applications referred to above, or, any other suitable device adapted to produce torsional vibration.

Also, while I have shown the load or the source of power as one or more acoustic diaphragms adapted to receive energy from or deliver energy to the link, it will be understood that my invention is not limited thereto, but may be used wherever it is desired to convert mechanical vibration into electrical vibration and vice versa.

Also, while I have shown and described certain preferred embodiments of my invention, it will be understood that modifications and changes may be made without departing from the spirit and scope of my invention, as will be apparent to those skilled in the art.

I claim:

A piezo-electric translating device including a pair of spaced piezo-electric crystals disposed in substantially parallel relation, separate bases for said crystals, a common base to which said separate bases are secured, internal electrode and clamping assemblies comprising bolts and cap plates, said bolts extending through said crystals and securing said cap plates at one end of said crystals and engaging said separate base members at the other, thereby clamping said crystals between said cap plates and said separate bases and a movable element held between said caps and adapted to be driven thereby.

In testimony whereof I hereunto affix my signature.

ALEXANDER McLEAN NICOLSON.